United States Patent
Carmel et al.

(10) Patent No.: US 6,941,297 B2
(45) Date of Patent: Sep. 6, 2005

(54) AUTOMATIC QUERY REFINEMENT

(75) Inventors: David Carmel, Haifa (IL); Eitan Farchi, Pardes Hanna (IL); Yael Petruschka, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 10/210,826

(22) Filed: Jul. 31, 2002

(65) Prior Publication Data

US 2004/0034632 A1 Feb. 19, 2004

(51) Int. Cl.[7] .............................................. G06F 17/30
(52) U.S. Cl. ........................................................ 707/3
(58) Field of Search ...................... 707/3, 5, 7; 342/22; 705/26

(56) References Cited

U.S. PATENT DOCUMENTS

| | | | | |
|---|---|---|---|---|
| 6,006,225 A | * | 12/1999 | Bowman et al. ............... | 707/5 |
| 6,128,613 A | * | 10/2000 | Wong et al. ................... | 707/7 |
| 6,252,538 B1 | * | 6/2001 | Chignell ....................... | 342/22 |
| 6,446,061 B1 | * | 9/2002 | Doerre et al. .................. | 707/3 |
| 6,636,848 B1 | * | 10/2003 | Aridor et al. .................. | 707/3 |
| 2003/0014403 A1 | * | 1/2003 | Chandrasekar et al. ........ | 707/5 |
| 2003/0172066 A1 | * | 9/2003 | Cooper et al. ................. | 707/7 |

OTHER PUBLICATIONS

David Carmel et al., Automatic Query Refinement using Lexical Affinities with Maximal Information Gain, 2002, IBM Labs, ACM Conference on Research & Devel.p, Tampere Finland, pp. 283–290.*

Reiner Kraft et al., Mining anchor text for query refinement, 2004, Int. WWW Conference, Proced. 13th on WWW, IBM Labs, ACM Association of Computing, pp. 666–674.*

* cited by examiner

*Primary Examiner*—Diane D. Mizrahi
(74) *Attorney, Agent, or Firm*—Stephen C. Kaufman

(57) ABSTRACT

A method for Automatic Query Refinement, the method including extracting at least one lexical affinity from at least one document in a search result set of documents, the set resulting from the application of a first query to a document search engine, adding the lexical affinity to the first query, thereby forming a new query, and applying the new query to the document search engine, resulting in a new search result set.

17 Claims, 4 Drawing Sheets

AUTOMATIC QUERY REFINEMENT

FIELD OF THE INVENTION

The present invention relates to information retrieval systems in general, and more particularly to Automatic Query Refinement therefor.

BACKGROUND OF THE INVENTION

The purpose of information retrieval systems is to enable users to identify documents from a given collection that best match the user's information needs. While existing search engines provide valuable assistance to users in locating relevant information, finding precise information is becoming increasingly difficult. This is especially true for large collections and for interactive systems where users tend to only look at the top k documents where k is small (e.g., 5–20 documents).

Automatic query refinement (AQR) techniques may be used to improve retrieval performance by refining the user's query, such as by adding terms to the query that are related to the original query terms. The goal of the refinement is to cover additional aspects of the information need as specified by the query. The expansion terms may be selected from a thesaurus, a synonym table, or a semantic word network such as Wordnet. Alternatively, AQR may be performed using relevance feedback techniques which draw terms from the top-ranked documents for a given query, based on the assumption that top-ranked documents are of particular relevance.

Recent studies have shown, however, that while AQR improves recall, it often harms precision, particularly among top-ranked documents, especially when applied to very large document collections. Recall is generally improved by AQR since the expansion terms broaden the scope of the query. Specifically, all documents retrieved for the original query are also retrieved for the expanded query, and new documents containing the expansion terms are added to the result set. Precision, however, may deteriorate if the expansion affects the order of the results returned by the search engine, causing non-relevant documents to precede relevant ones.

SUMMARY OF THE INVENTION

The present invention discloses a method for automatic query refinement, such as for use with document search engines, which focuses on improving precision of the top ranked documents. In the present invention, lexical affinities (LAs) are derived from documents in the result set of a query and are then added to the query to form a new query. A lexical affinity represents the correlation of words co-occurring in a document, and is identified by looking at pairs of words found in close proximity to each other. In the present invention, LAs are selected that contain exactly one of the original query terms, such that the new query re-ranks the search results of the original query, thereby improving precision while preserving recall. A novel method is disclosed for selecting candidate LAs used for refinement such that relevant documents are separated from irrelevant documents in the set of search results. The information gain of candidate LAs is determined using unsupervised estimation that is based on the scoring function of the search engine used.

In one aspect of the present invention a method for Automatic Query Refinement is provided, the method including extracting at least one lexical affinity from at least one document in a search result set of documents, the set resulting from the application of a first query to a document search engine, adding the lexical affinity to the first query, thereby forming a new query, and applying the new query to the document search engine, resulting in a new search result set.

In another aspect of the present invention the extracting step includes extracting a plurality of lexical affinities from the document, and the method further includes determining the information gain of each of the plurality of lexical affinities, and selecting at least one of the plurality of lexical affinities having the greatest information gain, and the adding step includes adding the selected lexical affinities.

In another aspect of the present invention the extracting step includes extracting the lexical affinity such that the lexical affinity includes exactly one of the terms of the first query.

In another aspect of the present invention the determining step includes calculating a relevance probability p(D) of the set of documents D to the first query q, where p(D) is the probability that a document chosen randomly from D is relevant to q, calculating an entropy value H(D) of the set D, and calculating the information gain IG(l) as $$IG(l) = H(D) - \left[ \frac{|D^+|}{|D|} H(D^+) + \frac{|D^-|}{|D|} H(D^-) \right]$$

where l represents the lexical affinity, $D^+$ is a target subset of documents of D containing l, and $D^-$ is the complement of $D^+$.

In another aspect of the present invention the step of calculating the entropy value H(D) includes calculating the entropy value as $H(D) = -p(D) \log(p(D)) - (1-p(D)) \log(1-p(D))$.

In another aspect of the present invention the step of calculating the relevance probability p(D) includes calculating an expectation E(X) of the number X of relevant documents in the first search result set of n documents, and estimating $$p(D) \text{ as } \hat{p}(D) = \frac{E(X)}{n} = \frac{\sum_{i=1}^{n}(p_i)}{n},$$

where for the n documents $\{d_1 \ldots d_n\}$ and the first query q, $p_i$ is the probability that document $d_1$ is relevant to query q.

In another aspect of the present invention the step of calculating the expectation includes defining an independent variable $x_i$ for each document $d_1$ representing the relevance of $d_1$, where $x_i$ is set to 1 with probability $p_i$ and to 0 with probability $(1-p_i)$, and where $x_i$ is a binomial independent variable with expectation $E(x_i)=p_i$ and variance $Var(x_i)=p_i(1-p_i)$, and calculating E(X) as $$E(X) = E\left(\sum_{i=1}^{n} x_i\right) = \sum_{i=1}^{n} E(x_i) = \sum_{i=1}^{n} p_i \text{ where } X = \sum_{i=1}^{n} x_i.$$

In another aspect of the present invention the method further includes preparing a virtual document from the first query, determining a search engine score $s_{max}$ for the virtual document within the context of the first query, determining a search engine score $s_i$ for each document in the first search results set, and calculating the relevance probability of each document as $p_i = s_i/s_{max}$.

In another aspect of the present invention a system for Automatic Query Refinement is provided, the system including means for extracting at least one lexical affinity from at least one document in a search result set of documents, the set resulting from the application of a first query to a document search engine, means for adding the lexical affinity to the first query, thereby forming a new query, and means for applying the new query to the document search engine, resulting in a new search result set.

In another aspect of the present invention the means for extracting includes means for extracting a plurality of lexical affinities from the document, and the system further includes means for determining the information gain of each of the plurality of lexical affinities, and means for selecting at least one of the plurality of lexical affinities having the greatest information gain, and where the means for adding includes means for adding the selected lexical affinities.

In another aspect of the present invention the means for extracting includes means for extracting the lexical affinity such that the lexical affinity includes exactly one of the terms of the first query.

In another aspect of the present invention the means for determining includes means for calculating a relevance probability p(D) of the set of documents D to the first query q, where p(D) is the probability that a document chosen randomly from D is relevant to q, means for calculating an entropy value H(D) of the set D, and means for calculating the information gain IG(l) as $$IG(l) = H(D) - \left[ \frac{|D^+|}{|D|} H(D^+) + \frac{|D^-|}{|D|} H(D^-) \right]$$

where l represents the lexical affinity, $D^+$ is a target subset of documents of D containing l, and $D^-$ is the complement of $D^+$.

In another aspect of the present invention the means for calculating the entropy value H(D) includes means for calculating the entropy value as $H(D) = -p(D) \log(p(D)) - (1-p(D)) \log(1-p(D))$.

In another aspect of the present invention the means for calculating the relevance probability p(D) includes means for calculating an expectation E(X) of the number X of relevant documents in the first search result set of n documents, and means for estimating p(D) as $$\hat{p}(D) = \frac{E(X)}{n} = \frac{\sum_{i=1}^{n} (p_i)}{n},$$

where for the n documents $\{d_1 \ldots d_n\}$ and the first query q, $p_i$ is the probability that document $d_1$ is relevant to query q.

In another aspect of the present invention the means for calculating the expectation includes means for defining an independent variable $x_i$ for each document $d_1$ representing the relevance of $d_1$, where $x_i$ is set to 1 with probability $p_i$ and to 0 with probability $(1-p_i)$, and where $x_i$ is a binomial independent variable with expectation $E(x_i)=p_i$ and variance $Var(x_i)=p_i (1-p_i)$, and means for calculating E(X) as $$E(X) = E\left(\sum_{i=1}^{n} x_i\right) = \sum_{i=1}^{n} E(x_i) = \sum_{i=1}^{n} p_i \text{ where } X = \sum_{i=1}^{n} x_i.$$

In another aspect of the present invention the system further includes means for preparing a virtual document from the first query, means for determining a search engine score $s_{max}$ for the virtual document within the context of the first query, means for determining a search engine score $s_i$ for each document in the first search results set, and means for calculating the relevance probability of each document as $p_i = s_i/s_{max}$.

In another aspect of the present invention a computer program is provided embodied on a computer-readable medium, the computer program including a first code segment operative to extract at least one lexical affinity from at least one document in a search result set of documents, the set resulting from the application of a first query to a document search engine, a second code segment operative to add the lexical affinity to the first query, thereby forming a new query, and a third code segment operative to apply the new query to the document search engine, resulting in a new search result set.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
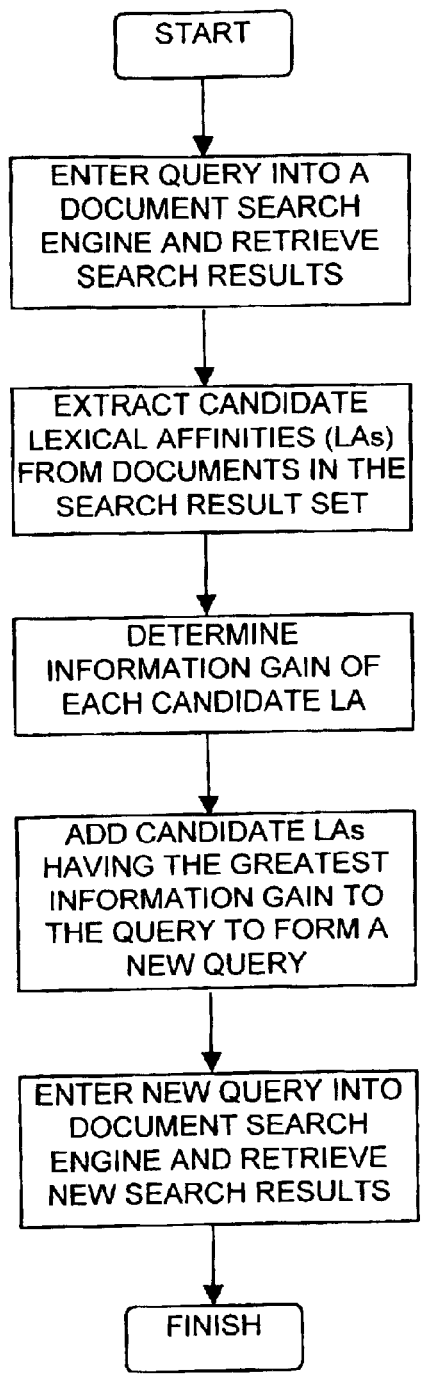
FIG. 1 is a simplified flowchart illustration of a method for Automatic Query Refinement, operative in accordance with a preferred embodiment of the present invention.

Reference is now made to FIG. 1, which is a simplified flowchart illustration of a method for Automatic Query Refinement, operative in accordance with a preferred embodiment of the present invention. In the method of FIG. 1, a query is entered into a document search engine and the search results are retrieved. Candidate LAs are then extracted from documents in the search result set, preferably only from the top n documents, where n is an integer>=1. Any conventional LA extraction technique may be used. A candidate LA is defined herein as a pair of closely related terms which contains exactly one of the original query terms. Each candidate LA is then evaluated to determine its "information gain," or the degree to which the candidate LA may be used to differentiate between relevant and non-relevant documents. A preferred method for calculating information gain for candidate LAs is described in greater detail hereinbelow with reference to FIG. 2. The m candidate LAs having the greatest information gain are then added to the query to form a new query, where m is an integer>=1. The new query is then entered into the document search engine and new search results are retrieved.

Figure 2:
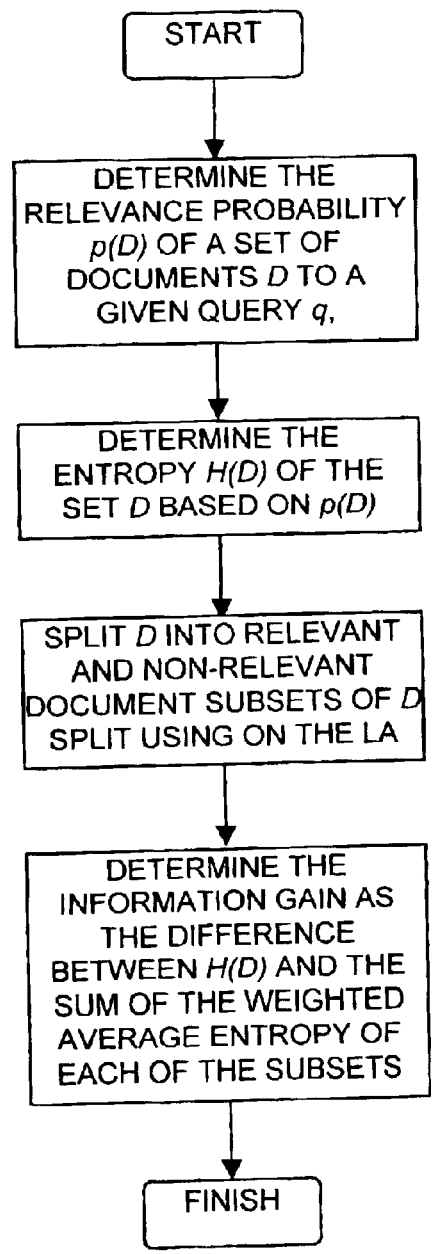
FIG. 2 is a simplified flowchart illustration of a method for calculating information gain for candidate LAs, operative in accordance with a preferred embodiment of the present invention.

Reference is now made to FIG. 2, which is a simplified flowchart illustration of a method for calculating information gain for candidate LAs, operative in accordance with a preferred embodiment of the present invention. The concept of "information gain" with regard to LAs may be understood as follows. Let Dq be the result set for a query q. For each candidate LA, Dq may be divided into two subsets, a target subset including all documents that contain the LA and a complement subset including all documents that do not contain the LA. Perfect order (zero entropy) is achieved where the target subset includes all relevant documents and the complement includes all non-relevant documents. Thus, the information gain of an LA is the amount by which the entropy of Dq decreases when divided into target and complement subsets using the LA.

The information gain of an LA may be calculated with reference to the following equations. The relevance probability of a set of documents D to a given query q, p(D), is defined herein as the probability that a document chosen randomly from D is relevant to q. Let $R \subseteq D$ be the subset of relevant documents to q in D. Then $p(D)=|R|/|D|$. A preferred method for estimating the relevance probability of a set of documents is described in greater detail hereinbelow with reference to FIG. 3.

The entropy of the set D, H(D), is defined herein as $$H(D) = -p(D) \log(p(D)) - (1-p(D)) \log(1-p(D))$$

where H(D) refers to the degree of disorder of the set.

Given a document set D and a term l, let $D^+$ be the target subset of documents of D containing l and $D^-$ its complement. The information gain of l, IG(l), is defined herein as $$IG(l) = H(D) - \left[ \frac{|D^+|}{|D|} H(D^+) + \frac{|D^-|}{|D|} H(D^-) \right] \quad \text{EQ. 1}$$

The first element of EQ. 1 describes the entropy of the set before splitting, while the second element describes the weighted average entropy of both subsets after splitting. The difference represents the information gain achieved by the splitting process, i.e., how much the entropy is reduced, or, stated alternatively, how much order has been added to the set. For ideal splitting where all relevant documents belong to one of the subsets and all non-relevant documents belong to its complement, the entropy will be reduced to zero and IG is maximal.

IG is thus computed for every LA in the set of candidate LAs, and the m LAs with maximal IG are chosen for query refinement. Alternatively, the IG for all subsets of LAs of a given size may be computed, with the subset with maximal IG chosen for expansion.

Figure 3:
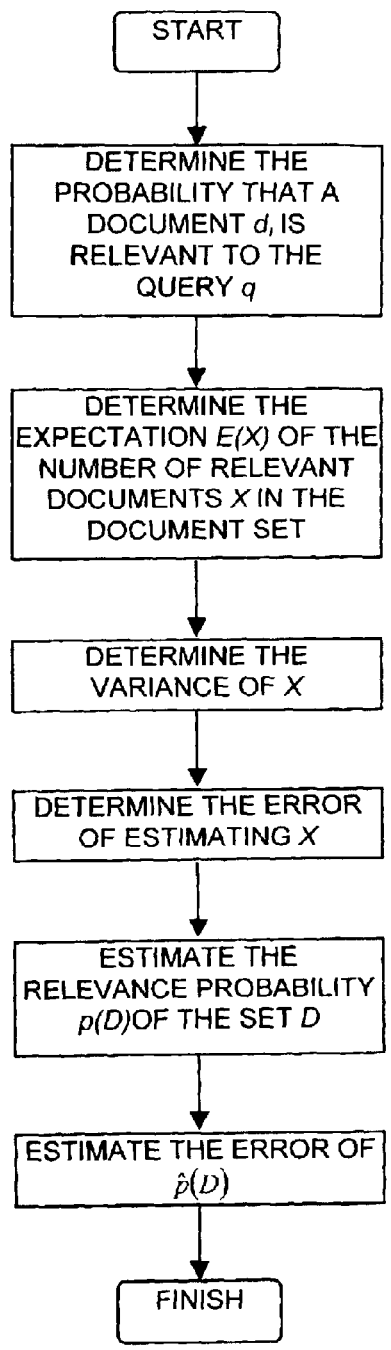
FIG. 3 is a simplified flowchart illustration of a method for relevance probability estimation of a set of documents, operative in accordance with a preferred embodiment of the present invention.

Reference is now made to FIG. 3, which is a simplified flowchart illustration of a method for relevance probability estimation of a set of documents, operative in accordance with a preferred embodiment of the present invention. Given a set of n documents $\{d_1 \ldots d_n\}$ and a query q, let $p_i$ be the probability that document $d_1$ is relevant to query q. For each document $d_1$ define an independent variable $x_i$ representing the relevance of $d_1$. That is, $x_i$ is set to 1 with probability $p_i$ and to 0 with probability $(1-p_i)$. $x_i$ is a binomial independent variable with expectation $E(x_i)=p_i$ and variance $Var(x_i)=p_i(1-p_i)$.

Let $$X = \sum_{i=1}^{n} x_i$$

where X is a random variable that counts the number of relevant documents in the document set. The expectation of X is $$E(X) = E\left(\sum_{i=1}^{n} x_i\right) = \sum_{i=1}^{n} E(x_i) = \sum_{i=1}^{n} p_i$$

where E(X) estimates X, the number of relevant documents in the set.

Since $x_i \ldots x_n$ are independent binomial variables, the distribution of X is normal and the variance of X is $$Var(X) = \sum_{i=1}^{n} Var(x_i) = \sum_{i=1}^{n} p_i(1-p_i)$$

Given $\delta > 0$, the error of estimating X can be measured by applying the Chebyshev inequality:

$$Pr(|X - E(X)| > \delta) \leq \frac{Var(X)}{\delta^2}$$

Let $p(D) = \frac{X}{n}$ be the relevance probability of the set D. p(D) may be estimated as $$\hat{p}(D) = \frac{E(X)}{n} = \frac{\sum_{i=1}^{n}(p_i)}{n}$$

From the Chebyshev inequality the error of $\hat{p}(D)$ may be estimated as $$Pr\left(|p(D) - \hat{p}(D)| > \frac{\delta}{n}\right) \leq \frac{Var(X)}{\delta^2}$$

As IG is a continuous function in p(D), $p(D^+)$ and $p(D^-)$, the error of IG may be estimated using the errors of these estimations using conventional techniques.

Figure 4:
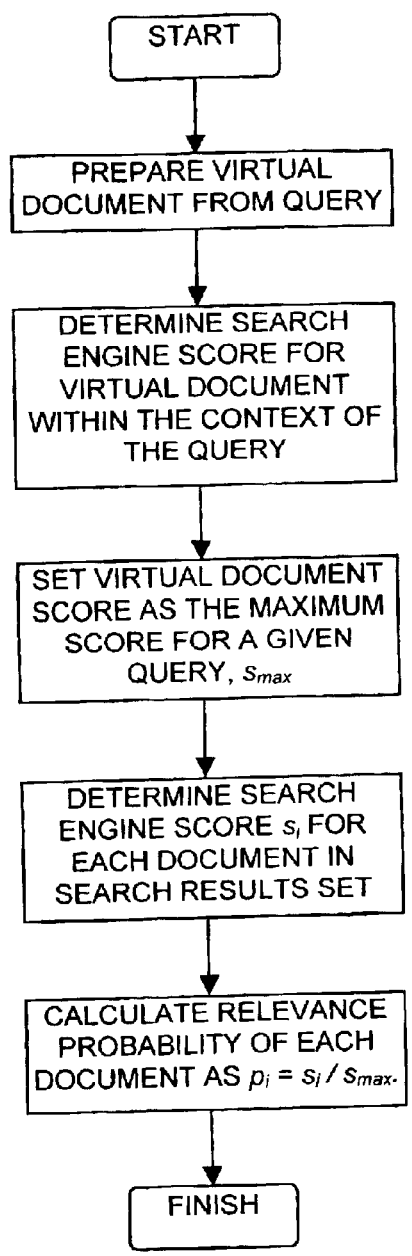
FIG. 4 is a simplified flowchart illustration of a method for relating search engine ranking scores to document relevance probability values, operative in accordance with a preferred embodiment of the present invention.

Reference is now made to FIG. 4, which is a simplified flowchart illustration of a method for relating search engine ranking scores to document relevance probability values, operative in accordance with a preferred embodiment of the present invention. The above measure of p(D) depends on a priori knowledge of the relevance probability of every document in the set to the query. These probabilities may be derived from the scoring function of the search engine used.

Let $s_{max}$ be the maximum search engine score possible for a given query. The relevance probability of a document associated with such a score is assumed to be 1. Let $s_i$ be the score for document $d_1$. Thus, a natural approximation of the relevance probability of document $d_1$ is $p_i = s_i/s_{max}$. This approximation guarantees that the probability assigned to each document preserves the order among documents (since if $s_i >= s_j$ then $p_i >= p_j$), assigns a relevance probability of 1 to documents with a maximum score, and a zero probability to documents with a zero score.

The maximum score for a given query, $s_{max}$, can be determined by treating the query itself as a virtual document (i.e., where the text of the query is used as the text of the virtual document) and having the search engine compute the score of the virtual document within the context of the query. The quality of the estimation is thus dependant to a great extent on the quality of the scoring function. For example, given a scoring function that associates a score of 1 to all relevant documents and 0 to all the rest, the estimation will succeed in measuring the true number of relevant documents in the set (with zero variance).

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer-implemented method for Automatic Query Refinement, the method comprising:
    extracting at least one lexical affinity from at least one document in a first search result set of documents D, said set resulting from the application of a first query q to a document search engine;
    adding said lexical affinity to said first query, thereby forming a second query; and
    applying said second query to said document search engine, resulting in a second search result set.

2. A method according to claim 1 wherein said extracting step comprises extracting a plurality of lexical affinities from said document, and further comprising:
    determining the information gain lG(l) of each of said plurality of lexical affinities; and
    selecting at least one of said plurality of lexical affinities having the greatest information gain, and wherein said adding step comprises adding said selected lexical affinities.

3. A method according to claim 1 wherein said extracting step comprises extracting said lexical affinity such that said lexical affinity includes exactly one of the terms of said first query.

4. A method according to claim 2 wherein said determining step comprises:
    calculating a relevance probability p(D) of said set of documents D to said first query q, wherein p(D) is the probability that a document chosen randomly from D is relevant to q;
    calculating an entropy value H(D) of said set D; and
    calculating said information gain IG(l) as $$IG(l) = H(D) - \left[\frac{|D^+|}{|D|}H(D^+) + \frac{|D^-|}{|D|}H(D^-)\right]$$

where l represents said lexical affinity, $D^+$ is a target subset of documents of D containing l, and $D^-$ is the complement of $D^+$.

5. A method according to claim 4 wherein said step of calculating said entropy value H(D) comprises calculating said entropy value as $$H(D) = -p(D)\log(p(D)) - (1-p(D))\log(1-p(D)).$$

6. A method according to claim 4 wherein said step of calculating said relevance probability p(V) comprises:
    calculating an expectation E(X) of the number X of relevant documents in said first search result set of n documents; and
    estimating pa) as $$\hat{p}(D) = \frac{E(X)}{n} = \frac{\sum_{i=1}^{n}(p_i)}{n},$$

where for said n documents $\{d_1 \ldots d_n\}$ and said first query q, $p_i$ is the probability that document $d_1$ is relevant to query q.

7. A method according to claim 6 wherein said step of calculating said expectation comprises:
    defining an independent variable $x_i$ for each document $d_1$ representing the relevance of $d_1$, wherein $x_i$ is set to 1 with probability $p_i$ and to 0 with probability $(1-p_i)$, and wherein $x_i$ is a binomial independent variable with expectation $E(x_i)=p_i$ and variance $Var(x_i)=p_i(1-p_i)$; and
    calculating E(X) as $$E(X) = E\left(\sum_{i=1}^{n}x_i\right) = \sum_{i=1}^{n}E(x_i) = \sum_{i=1}^{n}p_i$$

where $$X = \sum_{i=1}^{n}x_i.$$

8. A method according to claim 6 and further comprising:
    preparing a virtual document from said first query;
    determining a search engine score $s_{max}$ for said virtual document within the context of said first query;
    determining a search engine score $s_i$ for each document in said first search results set; and
    calculating said relevance probability of each document as $p_i=s_i/s_{max}$.

9. A computer-implemented system for Automatic Query Refinement, the system comprising:
    means for extracting at least one lexical affinity from at least one document in a first search result set of documents D, said set resulting from the application of a first query q to a document search engine;
    means for adding said lexical affinity to said first query, thereby forming a second query; and
    means for applying said second query to said document search engine, resulting in a second search result set.

10. A system according to claim 9 wherein said means for extracting comprises means for extracting a plurality of lexical affinities from said document, and wherein the system further comprises:
- means for determining the information gain IG(l) of each of said plurality of lexical affinities; and
- means for selecting at least one of said plurality of lexical affinities having the greatest information gain, and wherein said means for adding comprises means for adding said selected lexical affinities.

11. A system according to claim 9 wherein said means for extracting comprises means for extracting said lexical affinity such that said lexical affinity includes exactly one of the terms of said first query.

12. A system according to claim 10 wherein said means for determining comprises:
- means for calculating a relevance probability p(D) of said set of documents D to said first query q, wherein p(D) is the probability that a document chosen randomly from D is relevant to q;
- means for calculating an entropy value H(D) of said set D; and
- means for calculating said information gain IG(l) as $$IG(l) = H(D) - \left[\frac{|D^+|}{|D|}H(D^+) + \frac{|D^-|}{|D|}H(D^-)\right]$$

where l represents said lexical affinity, $D^+$ is a target subset of documents of D containing l, and $D^-$ is the complement of $D^+$.

13. A system according to claim 12 wherein said means for calculating said entropy value H(D) comprises means for calculating said entropy value as $$H(D) = -p(D) \log(p(D)) - (1-p(D)) \log(1-p(D)).$$

14. A system according to claim 12 wherein said means for calculating said relevance probability p(D) comprises:
- means for calculating an expectation E(X) of the number X of relevant documents in said first search result set of n documents; and
- means for estimating p(D) as $$\hat{p}(D) = \frac{E(X)}{n} = \frac{\sum_{i=1}^{n}(p_i)}{n},$$

where for said n documents $\{d_1 \ldots d_n\}$ and said first query q, $p_i$ is the probability that document $d_1$ is relevant to query q.

15. A system according to claim 14 wherein said means for calculating said expectation comprises:
- means for defining an independent variable $x_i$ for each document $d_1$ representing the relevance of $d_1$, wherein $x_i$ is set to 1 with probability $p_i$ and to 0 with probability $(1-p_i)$, and wherein $x_i$ is a binomial independent variable with expectation $E(x_i)=p_i$ and variance $Var(x_i)=(1-p_i)$; and
- means for calculating E(X) as $$E(X) = E\left(\sum_{i=1}^{n} x_i\right) = \sum_{i=1}^{n} E(x_i) = \sum_{i=1}^{n} p_i$$

where $$X = \sum_{i=1}^{n} x_i.$$

16. A system according to claim 14 and further comprising:
- means for preparing a virtual document from said first query;
- means for determining a search engine score $s_{max}$ for said virtual document within the context of said first query;
- means for determining a search engine score $s_i$ for each document in said first search results set; and
- means for calculating said relevance probability of each document as $p_i=s_i/s_{max}$.

17. A computer-implemented program embodied on a computer-readable medium, the computer program comprising:
- a first code segment operative to extract at least one lexical affinity from at least one document in a first search result set of documents, said set resulting from the application of a first query to a document search engine;
- a second code segment operative to add said lexical affinity to said first query, thereby forming a second query; and
- a third code segment operative to apply said second query to said document search engine, resulting in a second search result set.

* * * * *